United States Patent [19]

Van Dorsselaer

[11] Patent Number: 5,592,297
[45] Date of Patent: Jan. 7, 1997

[54] METHOD AND APPARATUS FOR ENCODING AND DECODING DIGITAL IMAGE DATA

[75] Inventor: Etienne L. M. E. Van Dorsselaer, El Sintjansteen, Netherlands

[73] Assignee: Oce-Nederland B.V., Netherlands

[21] Appl. No.: 375,512

[22] Filed: Jan. 18, 1995

Related U.S. Application Data

[63] Continuation of Ser. No. 101,295, Aug. 3, 1993, abandoned.

[30] Foreign Application Priority Data

Aug. 6, 1992 [NL] Netherlands ............................ 9201415

[51] Int. Cl.$^6$ ....................................................... H04N 1/41
[52] U.S. Cl. ........................ 358/261.1; 358/426; 358/432; 358/433; 358/261.3
[58] Field of Search ..................................... 358/426, 432, 358/433, 261.1, 261.3

[56] References Cited

U.S. PATENT DOCUMENTS

| | | | |
|---|---|---|---|
| Re. 33,632 | 7/1991 | Nakamura et al. | 358/426 |
| 3,909,514 | 9/1975 | Tanaka et al. | |
| 4,245,257 | 1/1981 | Yamazaki et al. | |
| 4,597,016 | 6/1986 | Nakamura et al. | 358/261.1 |
| 4,860,114 | 8/1989 | Horikawa et al. | 358/426 |
| 4,870,498 | 9/1984 | Schoon | 358/261.1 |
| 4,888,645 | 12/1989 | Mitchell et al. | 358/261.1 |
| 4,926,266 | 5/1990 | Kurosawa | 358/426 |
| 4,955,061 | 9/1990 | Doi et al. | 358/261.1 |
| 5,287,193 | 2/1994 | Lin | 358/426 |
| 5,291,303 | 3/1994 | Ishikawa | 358/426 |
| 5,302,949 | 4/1994 | Yoshinari et al. | 358/261.1 |
| 5,319,469 | 6/1994 | Moolenaar | 358/427 |
| 5,343,283 | 8/1994 | Van Dorsselaer et al. | 358/445 |

FOREIGN PATENT DOCUMENTS 0284511  9/1988  European Pat. Off. .

OTHER PUBLICATIONS

James C. Stoffel, Binary Image Coding, Graphical and Binary Image Processing and Applications, IEEE, vol. 68, No. 7, Jul. 1980 pp. 854–867.
Foreign Search Report.

*Primary Examiner*—Edward L. Coles, Sr.
*Assistant Examiner*—Thomas L. Stoll

[57] ABSTRACT

An encoding method for digital image data comprising consecutive blocks of data groups having as content binary values always of an equal number of pixels of an image, utilizing a code which indicates that the encoded block is partly equal to the corresponding part of a reference block, the reference block preferably being the preceding block, and identifies the end point of that part of the reference block by reference to transitions in pixel value in the reference block. On decoding, that part of the reference block is taken over in the decoded block.

This encoding method is, in practice, combined with run length encoding and encoding by copying an entire data group in the code.

27 Claims, 14 Drawing Sheets

| | a | b | c | d | e |
|---|---|---|---|---|---|
| series starting position: | → | | | | |
| nibble: | XXXX | 0000 | 0100 | 0111 | 1111 | 0000 |
| reference line: | | No | Yes(2) | Yes(1) | No | ← |
| nibble with ≥ 1 horizontal transition: | | | ↑↑ | ← | | Yes(1) |
| current line to be encoded: | XXXX | 0000 | 0100 | 0111 | 1111 | 1100 |
| vertical transition: | | | | | | ← |
| end of current series to be encoded: | | | | | | ← | code: m25 (nibbles a-d) + m4 (nibble e)

Fig. 8

METHOD AND APPARATUS FOR ENCODING AND DECODING DIGITAL IMAGE DATA

This application is a continuation, of application Ser. No. 08/101,295 filed on Aug. 3, 1993, now abandoned.

BACKGROUND OF THE INVENTION

1. Field of the Invention

The present invention relates to a method and apparatus for encoding and decoding digital image data and, more specifically, to the encoding and decoding of digital image data comprising consecutive blocks of data groups which are situated at consecutive positions within the blocks and which have as content binary values always of the same number of pixels of an image.

2. Discussion of Related Art

Encoding of image data is of use in systems for digitizing images, such as documents, by linewise scanning with a light-sensitive sensor, processing, storing in a memory and/or transmission of the scanning signals, and printing thereof, for example on paper. To digitize an image with sufficient quality it is necessary to extract and further process a very large number of data thereof and it is therefore desirable to be able to compress such data, particularly for storage and transmission. A first form of compression comprises changing from the multi-value scanning data (grey values) to binary signals (white or black), so that each signal can be represented by just one bit, but even then there is much image data left over. Taking the resolution of 300 dots per inch, which is frequently used in the art, each square centimeter of the image contains approximately 14000 image elements, known as pixels, so that almost one million bits are required for an A4 document.

A method as described herein is disclosed in Applicants' Netherlands patent application No. 9100225. In the known method, run length encoding is applied to a series of consecutive data groups in which each data group has the same content as the data group in the same position in the reference block. Consequently, the code contains the number of data groups in the series. Frequently, however, such series contain a very large number of data groups, such as, for example, in completely white areas at the top and bottom of a document. However, consecutive image lines may contain locally identical information even in parts of an original image which do contain image information, for example if the original image contains parallel lines perpendicular to the scanning direction. In such cases the run length code contains a long number and consequently the code is longer. Apart from the obvious objection of more space taken up by the code, another objection is the fact that the length of the codeword becomes variable as a result and this makes decoding more tedious. Although there are methods of obviating this disadvantage, they in turn make the codewords longer and thus reduce the possible compression factor.

SUMMARY OF THE INVENTION

Therefore, it is an object of the present invention to provide a method for encoding and decoding digital image data which will overcome the above-noted disadvantages.

It is a further object of the present invention to provide a method of compressing digital image data.

Still, a further object of the present invention is to provide an apparatus for encoding and decoding digital image data.

The foregoing objects and others are accomplished in accordance with the present invention, generally speaking, by providing a method and apparatus of encoding and decoding digital image data. The image data comprises consecutive blocks of data groups which are situated at consecutive positions within the blocks and which have as content binary values always of the same number of pixels of an image. In the method a series of consecutive data groups within a block to be encoded, having the same content as the data group in the same position in a reference block, is replaced by a code. The said code does not specify the number of data groups in the encoded series, but does specify the position of the end of the series with respect to a transition in pixel value in the reference block. A code of this kind is thus independent of the length of the series, and if only a small repertoire of possibilities is made available for the position indication, the code can be kept very short, even if very long series are encoded.

According to one embodiment of the method of the invention, the code also identifies the data group in which there is situated the transition in pixel value with respect to which the position of the end of the series is specified. Since the encoding according to the invention is always carried out for complete data groups simultaneously, it is sufficient to indicate in the code that data group of the reference block in which the intended transition in pixel value is situated. In another embodiment of the method according to the invention, the said code processes the serial number, counting from the position of the start of the series, of the data group having at least one transition in pixel value in which there is situated the transition in pixel value with respect to which the position of the end of the series is specified.

If a data group contains more than one transition, both in the block for encoding and in the reference block, it nevertheless counts as just one transition for the code. As a result, the distance that the code can bridge is increased. The number of serial numbers to be selected is preferably kept small, since otherwise a longer code is required.

In one specific embodiment of the method according to the invention, the encoding method described with reference to a reference block is combined with normal run length encoding. In this embodiment, starting at a starting position in a block for encoding, a check is made whether it is possible to effect encoding with reference to a reference block and run length encoding, and what their result is. That encoding method which yields the most efficient code, i.e. the shortest codeword, is then selected. It will be clear that if both encoding methods yield the same series, the reference encoding will quickly have preference, certainly for long series. In practice, the code for the reference encoding can be kept so short that this encoding method always has preference. Preferably, the reference block selected is the block directly preceding the block for encoding. This choice, of course, gives the greatest expectation of coincidence of pixel values.

Encoding in series form is not possible in every case. In such cases recourse may be had to the known encoding method in which the content of the next data group for encoding is completely included in the code, provided with a code prefix indicating that the code contains the data group itself. This solution is termed "copy encoding". No proof is necessary that this encoding method is very unfavorable, because the addition of the prefix results in data expansion instead of data compression. Nevertheless, the use of this encoding method is inescapable.

It appears that after a series encoding there follows practically always a data group which is not the start of a new series and which thus requires copy encoding. In one embodiment of the encoding method according to the invention, therefore, a series encoding is in most cases, as determined by a selection rule, automatically followed by a copy encoding of special form, namely without a code prefix. Since this selection rule is known on decoding, it is always clear when a copy code follows so that the prefix is superfluous. As a result, data expansion is obviated in these cases.

The present invention also relates to a method and apparatus for decoding a code stream formed by encoding digital image data according to the method of the invention. The configuration of the method and apparatus for decoding are a mirror image of the method and apparatus for encoding.

BRIEF DESCRIPTION OF THE DRAWINGS

The invention will now be described in detail by reference to the accompanying drawings wherein:

FIGS. 8–9 are examples of m25 codes.

DETAILED DISCUSSION OF THE INVENTION

Figure 1A:
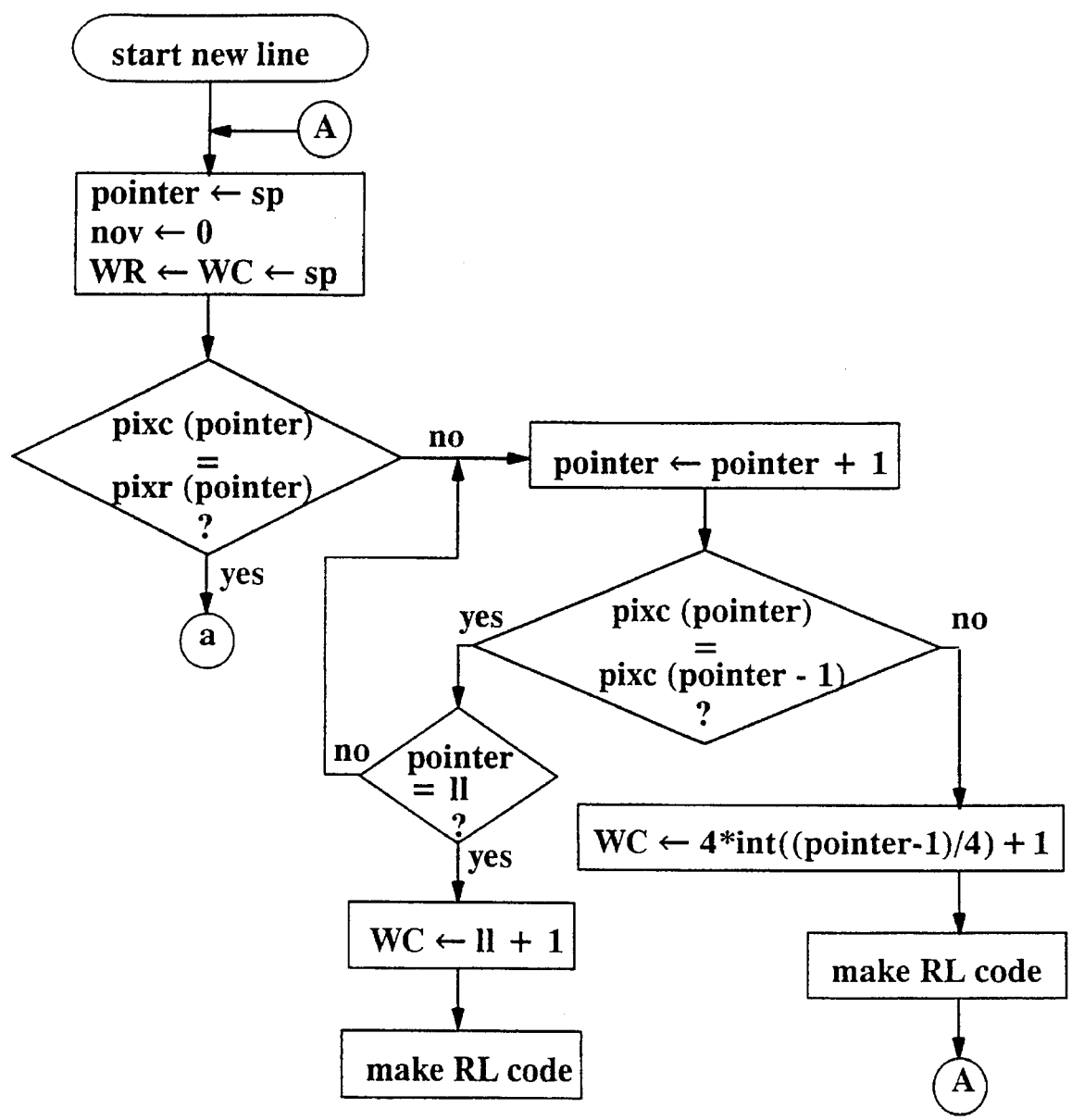
FIGS. 1A and 1B are flow diagrams of the procedure for checking consecutive pixel values.

The principles of the encoding method according to the invention will now first be described generally. In the exemplified embodiment described, the data for encoding is available in the form of groups of 4 bits known as nibbles. However, other numbers of bits per group can be encoded in the same way by adaptation of the method that is within the ordinary level of skill in the art. Examples of other numbers are 1 and 8 bits per group. A fixed number of groups always forms a block. A block is, for example, an image line while the bits correspond to the values of the pixels on that image line. A number of blocks (image lines) together correspond to an image of a document, the image data of which must be encoded for storage in a memory or for transmission to another device.

The data for encoding is always encoded in units of the size of the groups (nibbles). Generally, beginning from a starting position in a block, one or more groups of bits are replaced by a code, whereafter the next non-encoded bit (this is therefore always a first bit of a group) is designated as the next starting position.

The method comprises four different basic encoding procedures, one of which is selected according to the content of the bits for encoding:

(1) run length encoding (designation: m1), (2) takeover from the previous line (designation: m2), (3) takeover from the current line (designation: m3), and (4) codeless takeover from the current line (designation: m4)

Run Length Encoding (m1)

In run length encoding a series of nibbles in the block for encoding in which the bits all have the same value is counted and replaced by a code. The form of the code is:

01cxxxxx where "01" forms the code prefix which indicates that it is a run length code, "c" indicates the value (0 or 1) of the bits, and xxxxx indicates in binary form the number of nibbles in the encoded series. An extra codeword, consisting entirely of the number code, is added for larger numbers of nibbles than can be reproduced by a binary number of five bits. The value "00000" of xxxxx (which is not used for obvious reasons) is now used as an escape code in order to signal this to the decoder.

In decoding, each code is again expanded to the specified number of nibbles of bits with the value c.

Takeover from the Previous Line (m2)

In this method of encoding a series of nibbles, within the block for encoding in which the bits each have the same value as the bit in the same position in the reference block (normally the preceding block), is replaced by a code which relates the end of the series to a value change in the reference block, i.e. to a bit in the reference block having a value which is the opposite of the value of the immediately preceding bit in the reference block. The code also specifies what value change in the reference block is meant, counting from the starting position. The following codes are used in this procedure. After each code is given the designation used in this description and the meaning of the code to the decoder.

000 (designation: m21): take over the content of the reference block from the position corresponding to the starting position until the beginning of the first nibble in the reference block in which a value change occurs.

00100 (designation: m22): take over the content of the reference block from the position corresponding to the starting position up to and including the end of the first nibble in the reference block in which a value change occurs.

Figure 6:
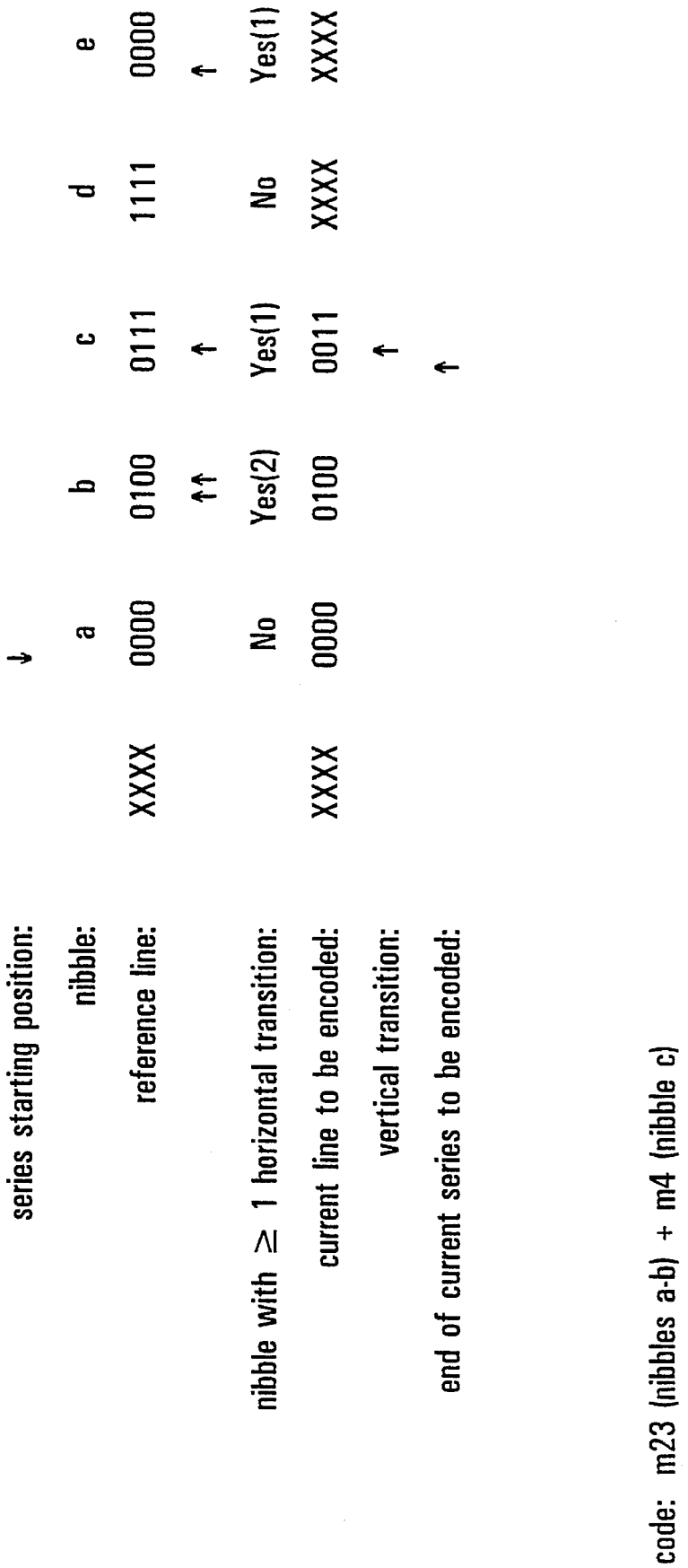
FIG. 6 is an example of an m23 code.

00101 (designation: m23): take over the content of the reference block from the position corresponding to the starting position up to the beginning of the second nibble in the reference block in which a value change occurs. FIG. 6 depicts an example of an m23 code to which is appended an m4 code. FIG. 6 includes a portion of a reference line divided into nibbles, or groups, having four pixels per nibble. The pixels in the group preceding the start of the relevant portion of the reference line are indicated by an X rather than a 0 or 1. Each group is labelled with an alphabetic character for ease of reference. The starting position of the series is indicated by a downward pointing arrow above the first pixel in group a. Those groups having at least one horizontal transition, i.e., a difference between adjacent pixels, are labelled with a "yes", with the number of horizontal transition pixels indicated in parentheses and also with upward pointing arrows.

Also in FIG. 6, in the current line to be encoded, the pixels that follow the last group in the series are labelled with an X rather than a numeral 0 or numeral 1. The vertical transition, i.e., a difference in value between corresponding pixels in the reference line and in the current line to be encoded is indicated by an upward pointing arrow. Also, the end of the series to be encoded is indicated by another upward pointing arrow.

As mentioned above, the code for the example in FIG. 6 is an m23 code followed by an m4 code (discussed below). An m4 code will always be added to an m23 or m25 code. In FIG. 6, the vertical transition occurs at the second pixel in group c. Thus, group a, group b, and the first pixel of group c are the same in both the reference line and the current line.

Figure 7:
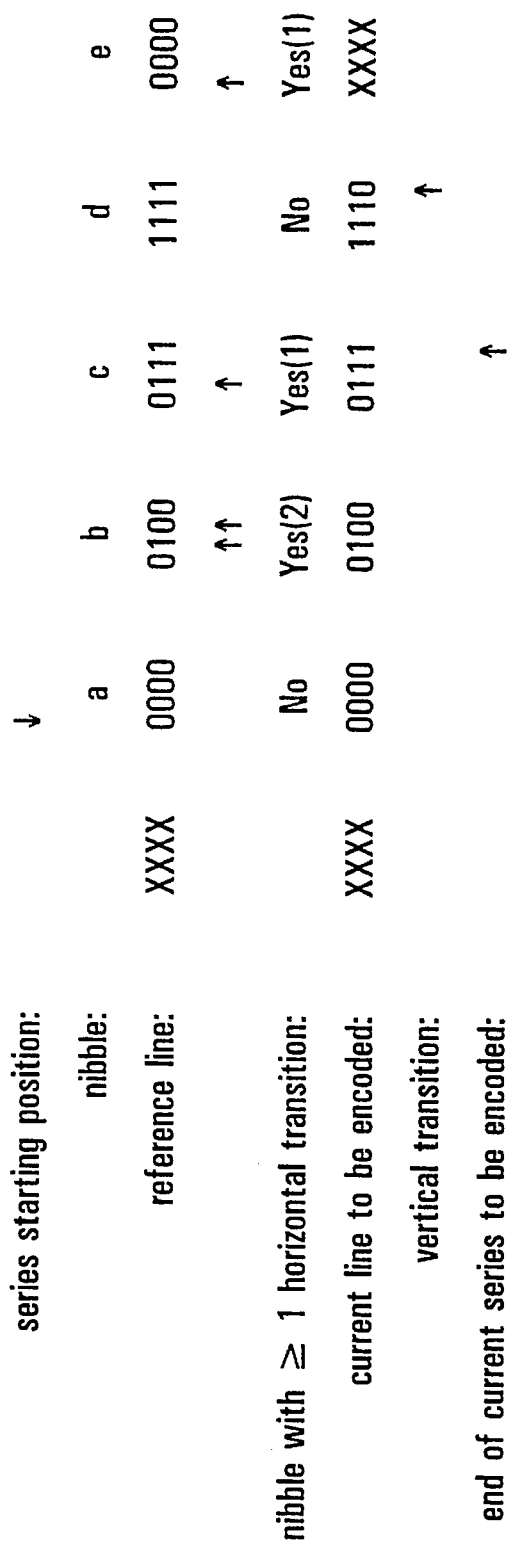
FIG. 7 is an example of an m24 code.

00110 (designation: m24): take over the content of the reference block from the position corresponding to the starting position up to and including the end of the second nibble in the reference block in which a value change occurs. FIG. 7 is an example of the use of an m24 code. The vertical transition occurs in the fourth pixel of group d because of a horizontal transition between the third and fourth pixel in group d of the current line. In contrast, no horizontal transition occurs in group d of the reference line. Because no horizontal transition occurs in group D of the reference line, we must encode with respect to the immediately proceeding group in the reference line that has a horizontal transition, namely group c. Group c in the reference line is identical to group c in the current line because the vertical transition takes place in group d. Consequently, groups a–c are encoded with the m24 code.

00111 (designation: m25): take over the content of the reference block from the position corresponding to the starting position up to the beginning of the third nibble in the reference block in which a value change occurs. FIG. 8 depicts an example of the use of an m25 code. The vertical transition occurs in the first pixel of group e because of a horizontal transition, in the reference line, between the last pixel of group d and the first pixel of group e. Here, the end of the series to be encoded corresponds to the vertical transition, i.e., the first pixel of group do In other words, the end of the series corresponds to the third group in the series in which there is at least one horizontal transition. An m4 code is appended to the m25 code.

Figure 9:
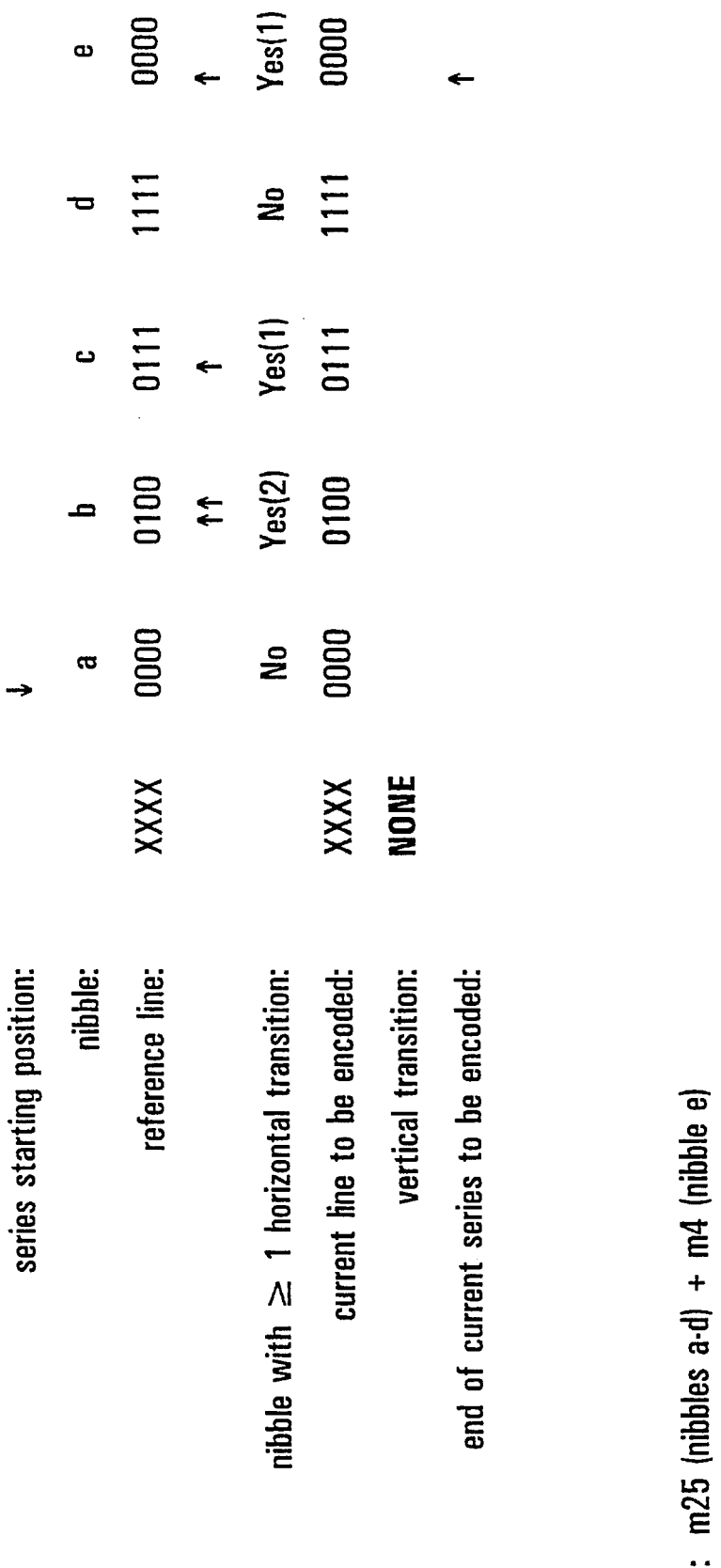

FIG. 9 is another example of the use of an m25 code. In FIG. 9, there is no vertical transition, i.e., groups a–c in the reference line are identical to groups a–c in the encoding line. This illustrates the maximum length of a series that can be encoded given the number of encoding bits available in this embodiment. The end of the series corresponds to the first pixel in group e. Given the two bits available to encode the number of groups in the reference line having at least one horizontal transition, then the maximum length of the series corresponds to the third group in the series having at least one horizontal transition; in FIG. 9, that group is group e. Again, an m4 code is appended to the end of the m25 code (representing nibbles a–d).

For the above codes, it is immaterial whether more than one or exactly one value change occurs in a nibble: either case counts as a "value change".

Takeover from the Current Line (m3)

In this encoding method, the next nibble for encoding is completely contained in the code. This has the following form:

1 bbbb where bbbb are the values of the bits of the intended nibble. This encoding method will be used only if none of the other coding methods is usable.

For decoding, the content of the part bbbb of the code is added to the data stream.

Codeless Takeover from the Current Line (m4)

This encoding method is the same as the preceding one but has no code prefix. It is automatically either carried out or not carried out after one of the other codings, in accordance with a rule known both to the encoder and the decoder. The reason for this is that in many cases encoding in accordance with one of the other encoding methods, of the nibbles directly prior to the nibble for encoding, has been terminated because an irregularity in the bit pattern occurs in the next nibble i.e. the nibble now to be encoded. It is then advantageous for the next nibble also to be taken over into the code gratuitously. If the preceding code is an m22 or an m24 code, then no m4 code follows, because then the irregular nibble has already been included in the preceding code. In all other cases, an m4 code is always added. The code word has the form:

bbbb which is equal to the content of the nibble in question.

Since the decoder has the same selection rule, it is known when this code is used so that the situation remains unambiguous despite the absence of the code prefix. The decoder adds the value bbbb to the decoded data stream.

Decoding can be performed very rapidly and simply by the choice of the code words. If the decoder sees a "1" as the first code bit, the m3 decoding procedure is immediately selected If the first code bit is a "0", then the second code bit is examined If this is a "1", then the next six code bits are interpreted as a run length code (m1) and if these six code bits contain the escape code c00000, the next byte is also decoded as an extra run length code.

If the second code bit is a "0", the next bit is examined If this is a "0", then the code is an m21 code and the following code bit forms the first of the next codeword If the third code bit is a "1", the two following bits determine the type of code, m22, m23, m24 or m25. The decoding procedure for these codes has already been described above. An m21, m23 and m25 code is always followed by an m4 code, i.e., the next four code bits are taken over as values of the bits in the nibble.

The procedure during encoding of a data stream, e.g. binary pixel values of an image, will now be explained by reference to the drawings.

The pixel values (bits) are supplied in consecutive image lines, the length (11) of which is known in numbers of bits. The following variables are also used in the Figures:

pointer=current variable which always indicates the position in the line of the pixel value for encoding sp=the starting position, the first bit for encoding following the last encoded bit pixc(i)=the value of pixel i in the line for encoding (0 or 1)

pixr(i)=the value of pixel i in the reference line (0 or 1)

WC=the starting position of the first nibble in the line for encoding, in which a value change has occurred WR=the starting position of the nibble, relevant for encoding, in the reference line, in which a value change has occurred nov=a state variable which indicates that it is no longer possible to take over nibbles from the reference line in the current cycle; it is reset (0) when a new sp is defined, and set at the time when it is found that pixc(pointer) and pixr(pointer) have unequal values nr=The number of nibbles in which a value change occurs in the reference line counting from the sp.

Figure 1B:
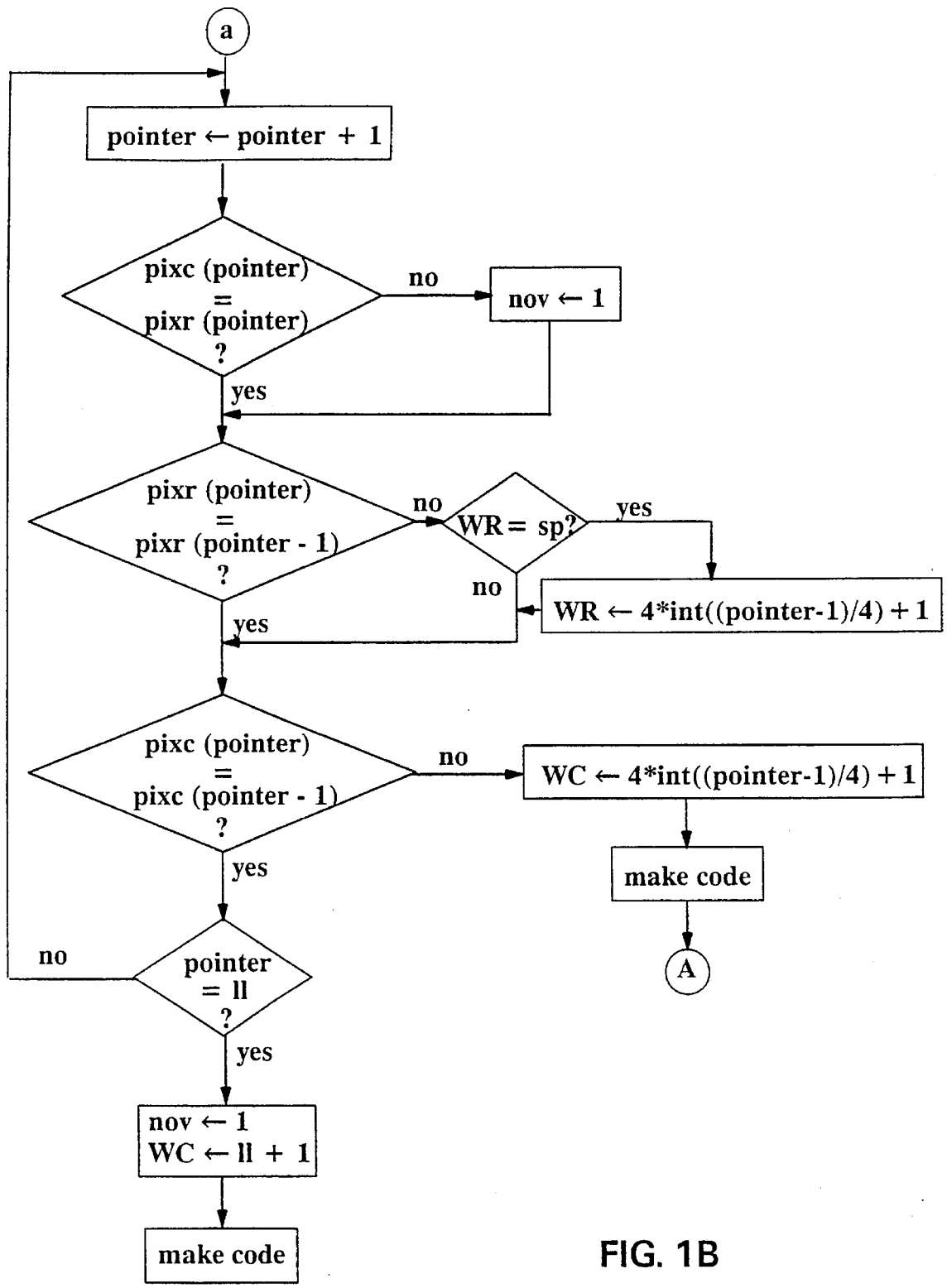

FIGS. 1A and 1B describe the investigation of the pixel values one by one in the line for encoding. If a value change is found in that line, then a separate routine is adopted to make a code as described in FIGS. 2A and 2B. If this routine shows that there is also a value change in the reference line at the position of the value change, then a check is made whether a longer series is to be encoded with an m2 code. This is described in FIGS. 3A, 3B, 3C and 3D.

The procedure in FIG. 1A starts at the beginning of a new line or a new code series within the current line (A). In an initialization routine, the value of the pointer, WR and WC is made equal to the starting position and nov is reset. A check is then made whether the first pixel value of the line for encoding is the same as that of the reference line. If not, then only the encoding methods m1 and m3 are possible, and in that case the procedure continues with counting equal pixel values in the line for encoding, after which a procedure is adopted to form the code in dependence on the length of the series found during the count (FIG. 2B). During counting a check is made whether the end of the line is reached and if so then the procedure for forming a code in FIG. 2B is forcedly adopted.

If the first pixel values of the line for encoding and the reference line are the same, a loop routine is started as described in FIG. 1B. In this a check is made in each case for a subsequent pixel value to determine whether the pixel values at the pointer position in the line for encoding and the reference line are equal to one another and whether they are each equal to the pixel value in the position preceding them. If the pixel values at the pointer position in the line for encoding and reference line are not equal to one another, then any m2 code series can in no case proceed beyond the nibble in which the pointer is at that moment situated. This is determined by giving the variable nov the value "1". If a value change has occurred at the pointer position in the reference line, then if this is the first time after the starting position the starting position of the current nibble is stored in WR.

If a value change has occurred at the pointer position in the line for encoding, then the loop of FIG. 1B is left and the procedure for forming a code is adopted. The loop of FIG. 1B is also left if the end of the line for encoding is reached. Here again the forming of a code is forced by giving some variables a different value.

Figure 2A:
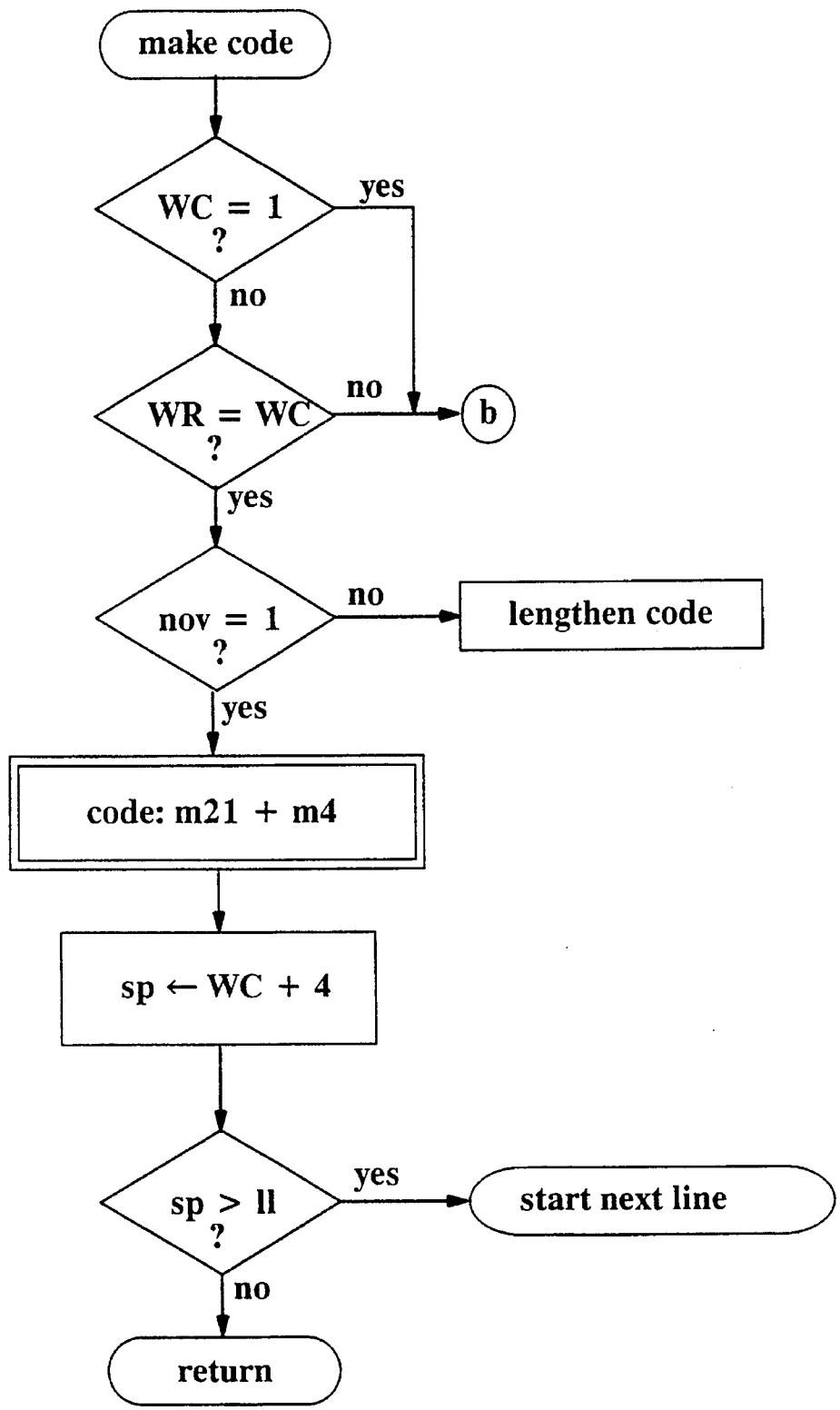
FIGS. 2A and 2B are flow diagrams of the procedure for forming a code.
Figure 2B:
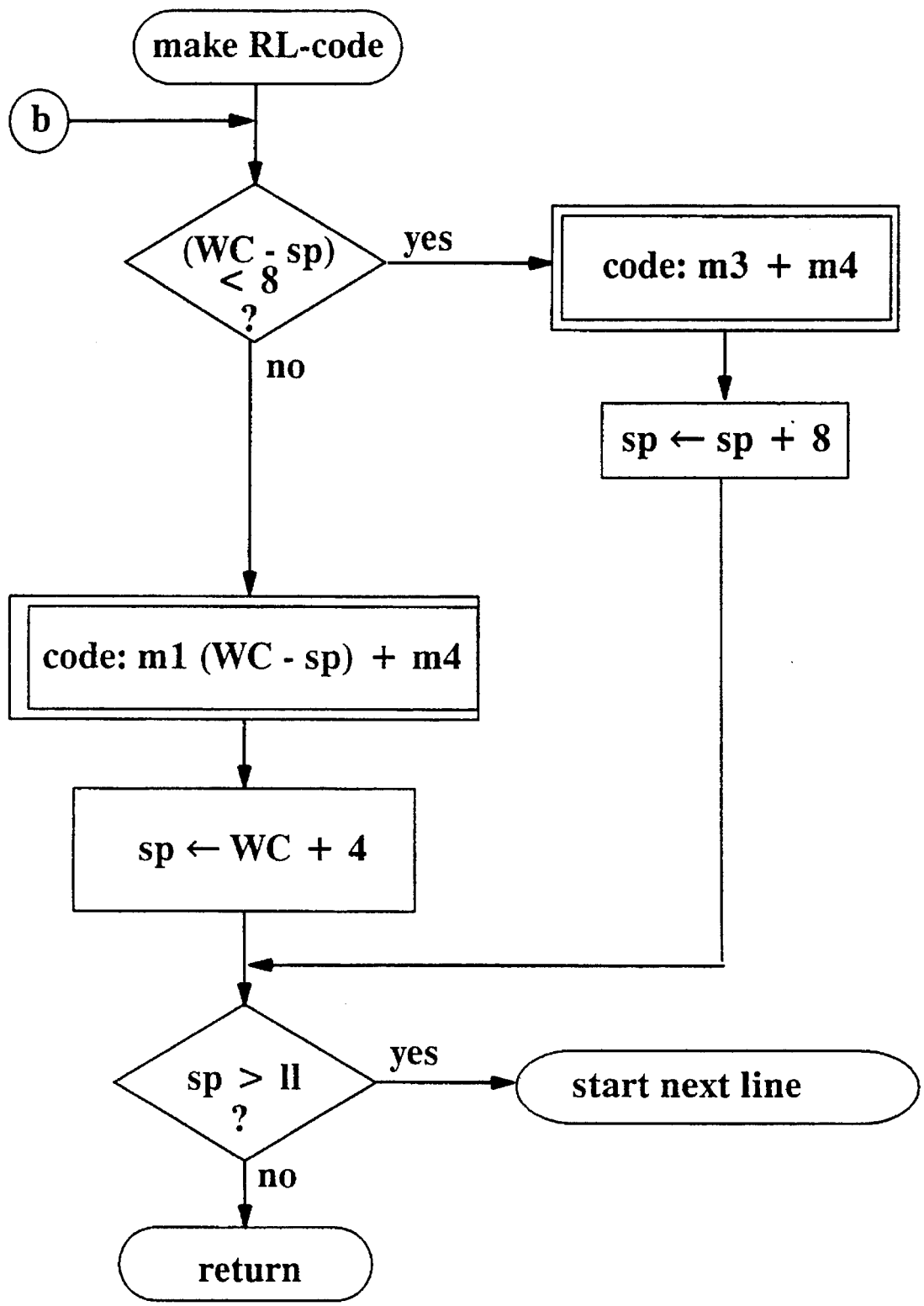

The procedure for forming a code is shown in FIGS. 2A and 2B. This procedure consists of two branches, one for forming an m2 code (FIG. 2A) and the other for forming an m1 or an m3 code respectively (FIG. 2B). Before a choice is made between one of these two branches, a check is made to determine whether the pointer is still in the first nibble after the starting position. If so, then only an m3 code is possible, and for that purpose the m1/m3 branch is immediately taken.

If the pointer is already past the first nibble, the starting positions of the first nibbles in which a value change has occurred, in the line for encoding (WC) and in the reference line (WR), are compared with one another. Since this procedure is adopted at the first value change in the line for encoding, WC is thus always the starting position of the current nibble. If WR is smaller than WC, then a value change has occurred in the reference line rather than in the line for encoding, and run length encoding is selected because a longer series can be encoded by this. Since an m2 code is shorter than a run length code, m2 encoding could also be chosen if WR is a small number of positions, for example 4 (one nibble), smaller than WC, but that has not been worked out in this example.

In the case of run length encoding (FIG. 2B), a check is first made whether the series of nibbles for encoding consists of at least two elements (8 pixel values). If this is so, an m1 code is formed for the nibbles from the starting position up to the current nibble, with the value of the pixels in the nibble preceding the current nibble as the value for the bit "c" in the code, followed by an m4 code. A new starting position is then determined for the next code cycle and a test is carried out as to whether this new starting position extends past the end of the line (this is possible as a result of the m4 code), in which case everything is prepared for encoding the following line. The decoder is informed of the length of the lines so that the code does not have to be adapted. Any excessive pixel values generated are simply cancelled. If the number of nibbles for encoding is smaller than or equal to 2, an m3 code is formed for the first nibble for encoding, followed by an m4 code, so that in each case the entire series is encoded. A check is again made as to whether the line end is reached.

If WC and WR are equal, the branch for the m2 codes is taken in the procedure for forming a code. In this case, a value change has occurred in the line for encoding and in the reference line, in the same nibble. A check is now made whether there was already a value change in that nibble in the reference line. If that is the case (nov=1) then the line for encoding, from the starting position up to the current nibble, is equal to the reference line (encoding is always effected in whole nibbles) and this part of the line for encoding can be encoded with an m21 code followed by an m4 code. A new starting position is then determined for the following code cycle and a test is again made as to whether this new starting position extends past the end of the line.

If WC and WR are equal and if nov is still equal to 0, then the value change found is apparently situated in the same position in the line for encoding as the first value change in the reference line, and both lines are equal from the starting position up to and including the current pixel value. A check is now made whether the encoding can be extended by reference to the reference line to an m22, m23, m24 or m25 encoding. This is described with reference to FIGS. 3A, 3B, 3C and 3D.

Stepping along the pixel values of the line for encoding, this procedure is aimed at finding a series of consecutive positions in which the pixel values in both lines are equal 2 by 2. At the instant that this is no longer the case the encoding cannot be continued and the code is formed. This code relates the end of the series of nibbles for copying from the reference line during decoding from the reference line, to a specific value change named by name in the reference line and will therefore depend on whether the first value change not occurring simultaneously in the two lines is situated in the line for encoding or in the reference line. If this value change is situated in the reference line, a code is selected which describes a series from the starting position up to the nibble in which the value change is situated (m23 or m25). An m4 code following thereon then encodes the nibble with the value change itself. If the value change in question is situated in the line for encoding, the end of the series described by the code cannot extend further than up to and including the nibble in which the last value change was situated in the reference line (m22 or m24). In that case the addition of an m4 code is not logical, because the nibble following thereon will frequently not contain any value change.

The procedure will now be described in detail. At the start, the variable nr in which the number of nibbles in the reference line with at least one value change is noted, is brought to the value "1" since, of course, the first value change has already been found. A loop operation is then started, in which the pointer is always set one pixel value further and then a test is made whether a value change has occurred at the new pointer position in the line for encoding and/or the reference line. After a test for the end of the line being reached the loop returns to its start.

If a value change is found in the line for encoding, a subroutine follows (FIG. 3B) in which a check is first made whether there is also a value change in the same position in the reference line. If that is so, a check is made whether a value change has already been found in the reference line in the current nibble. This test is carried out by determining the starting position WR' of the nibble and comparing it with the starting position WR of the nibble in which the previous value change was found in the reference line. If WR' and WR are equal, then the last value change found really is situated in a nibble which already contains another value change and can therefore be cancelled because the number of value changes per nibble is not used for the encoding as long as they occur simultaneously in both lines. If WR' and WR are unequal, a new nibble is obviously found with a value change and this is administered by raising the value of nr by 1 and making WR equal to that of WR'. The code can point ahead to a maximum of three nibbles and a test is now therefore made whether the number of nibbles found from the starting position (nr) has reached the value 3, in which case this code cycle is terminated by forming an m25 code followed by an m4 code, calculating a new starting value and the usual test for reaching the line end.

If the variable nr has not yet reached the value 3 and also if WR' and WR are equal, the procedure returns to the loop (FIG. 3A) and the next pixel value .is examined.

Figure 3A:
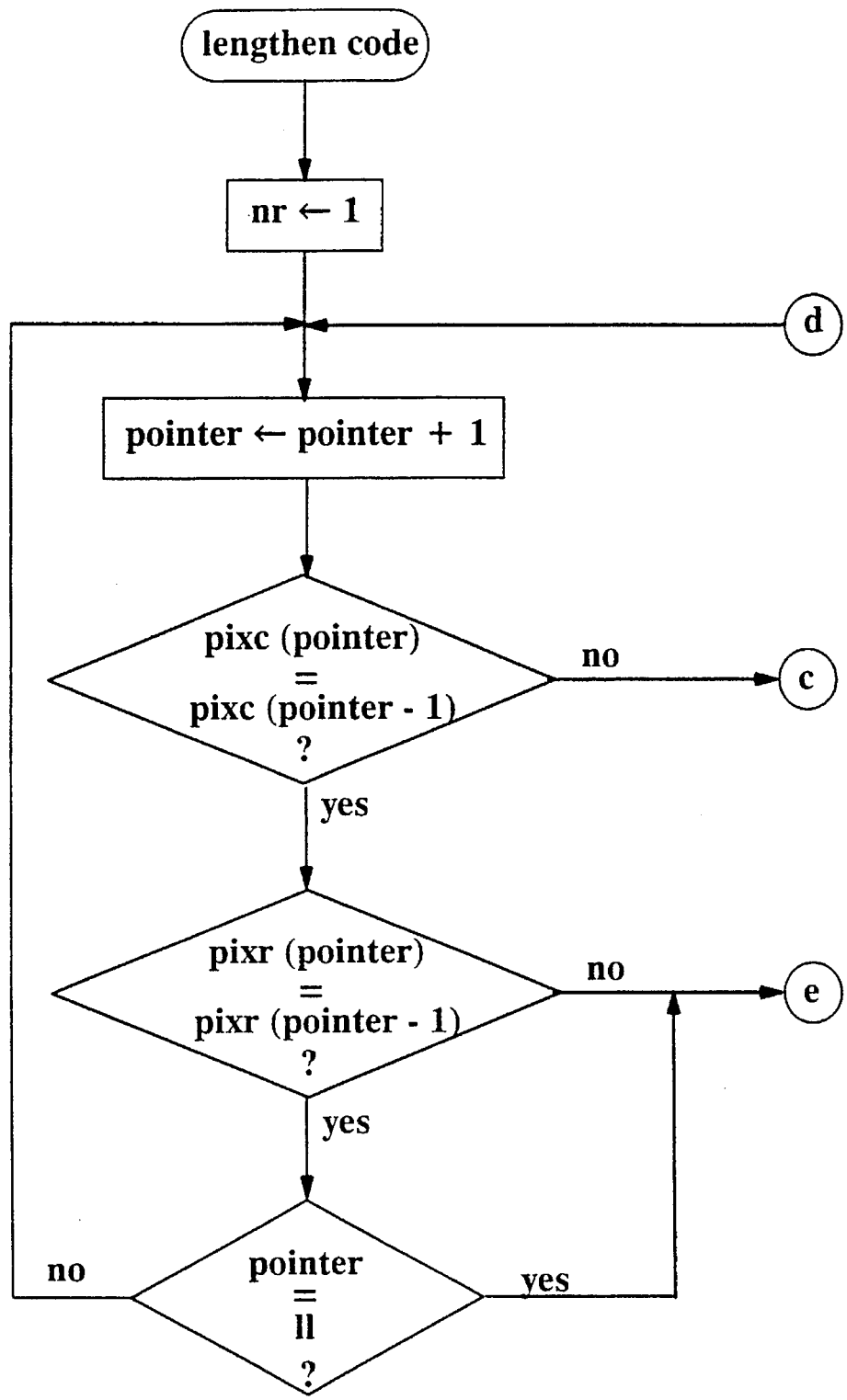
FIGS. 3A, 3B, 3C and 3D are flow diagrams of the procedure for forming a code for a series of pixel values to be taken over from the reference block.
Figure 3B:
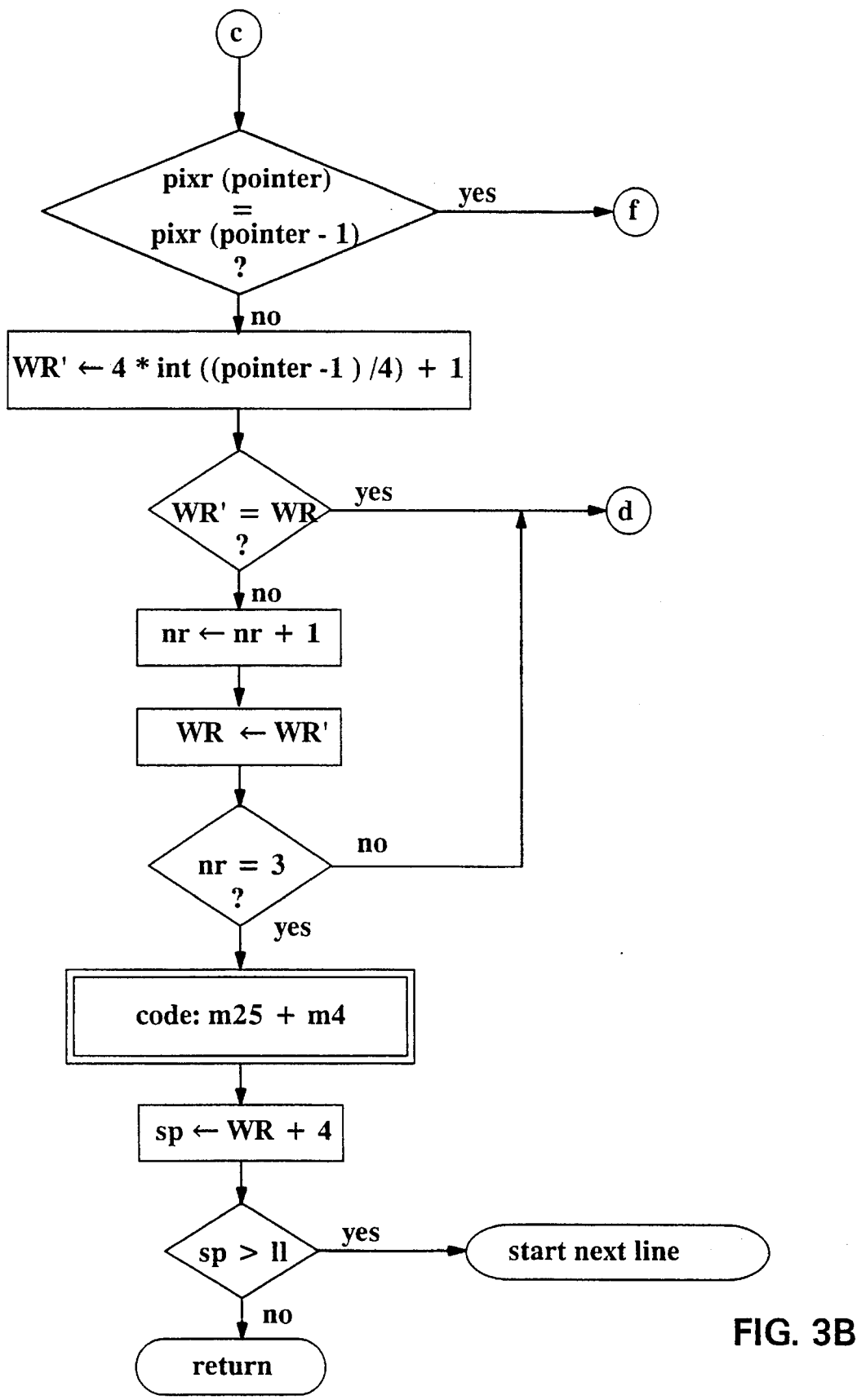
Figure 3C:
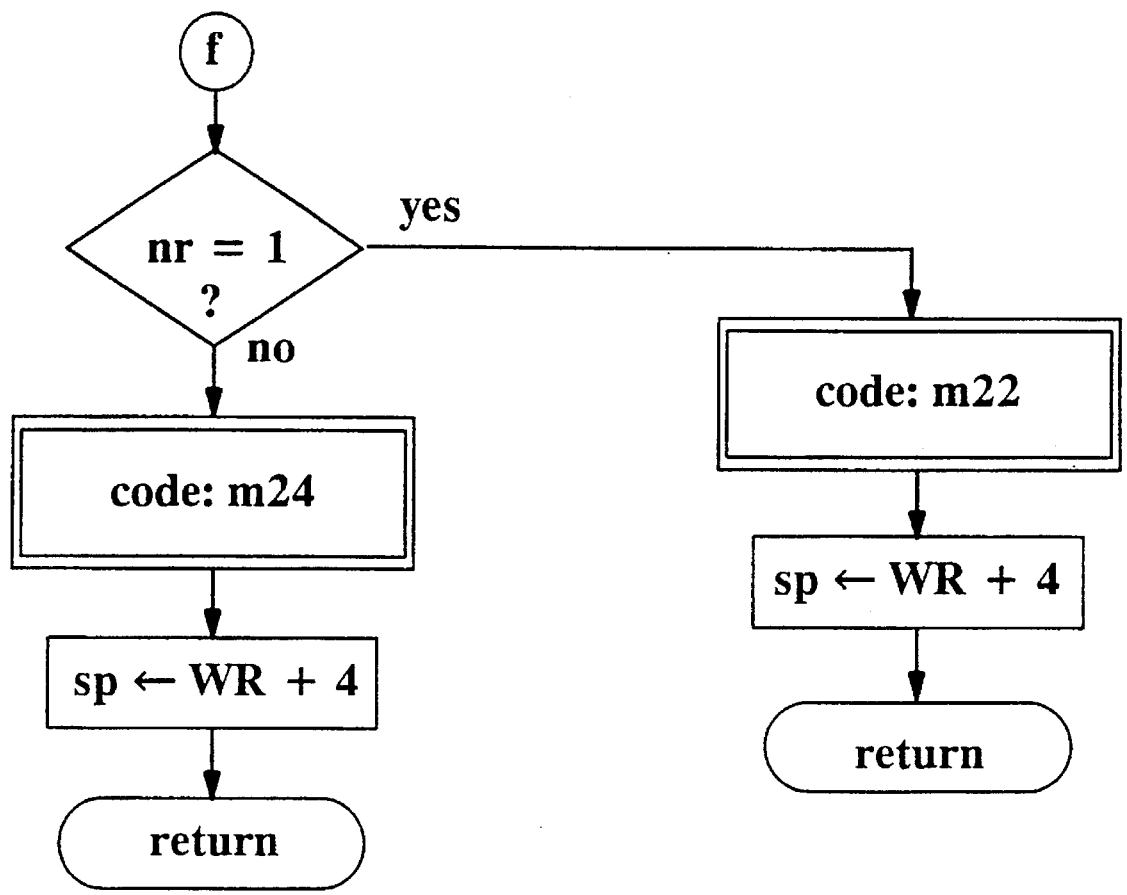

If at the start of the subroutine of FIG. 3B no value change is found in the reference line, so that there has been a value change in the line for encoding and not in the reference line at the pointer position, then the end of the encodable series is reached and a code is formed (FIG. 3C) in dependence on the number (nr) of nibbles found in the meantime with at least 1 value change. If this number is 1, then an m22 code follows, otherwise (nr=2) an m24 code. No m4 code then follows. A new starting position is then determined and a new encoding cycle started. In this case no test is necessary for the line end, because in an m22 and an m24 code the end of the encoded series is set back with respect to the pointer position.

Figure 3D:
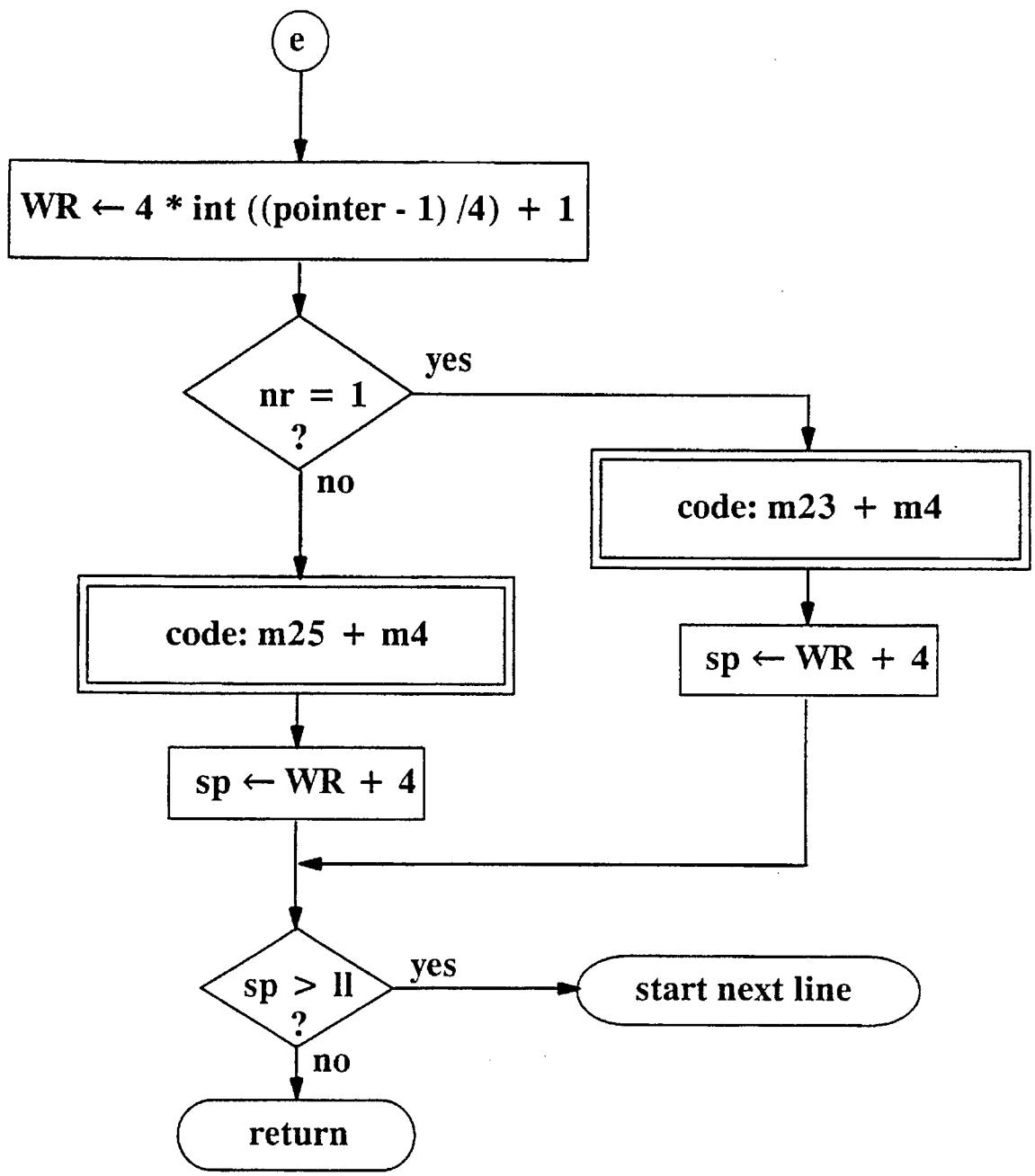

If no value change is found in the line for encoding in the loop shown in FIG. 3A, a check is made within the loop whether there has been a value change in the reference line at the pointer position. If this is also not the case, then the two lines are equal and the next pixel value can be checked. If a value change is found, the end of the encodable series is reached and a code (m23 or m25) is formed in a subroutine which is shown in FIG. 3D. In this subroutine the starting position of the current nibble is first determined in order to determine the new starting position. Depending on the number of nibbles already found with at least 1 value change (nr), an m23 code is then formed (for nr=1) or an m25 code (for n=2), followed by an m4 code in both cases. A new starting position is then determined, a test is made for reaching the end of the line and then a new encoding cycle is started.

An apparatus for performing the encoding or decoding according to the invention can be embodied by programming a general computer in accordance with the flow diagrams shown in the drawings and requires no further explanation. An apparatus can also be constructed which performs the same operations with tailored hardware circuits or which consists of a suitably programmed computer expanded with hardware circuits for specific functions. Here, too, numerous variants are possible within the scope of the invention.

Figure 4:
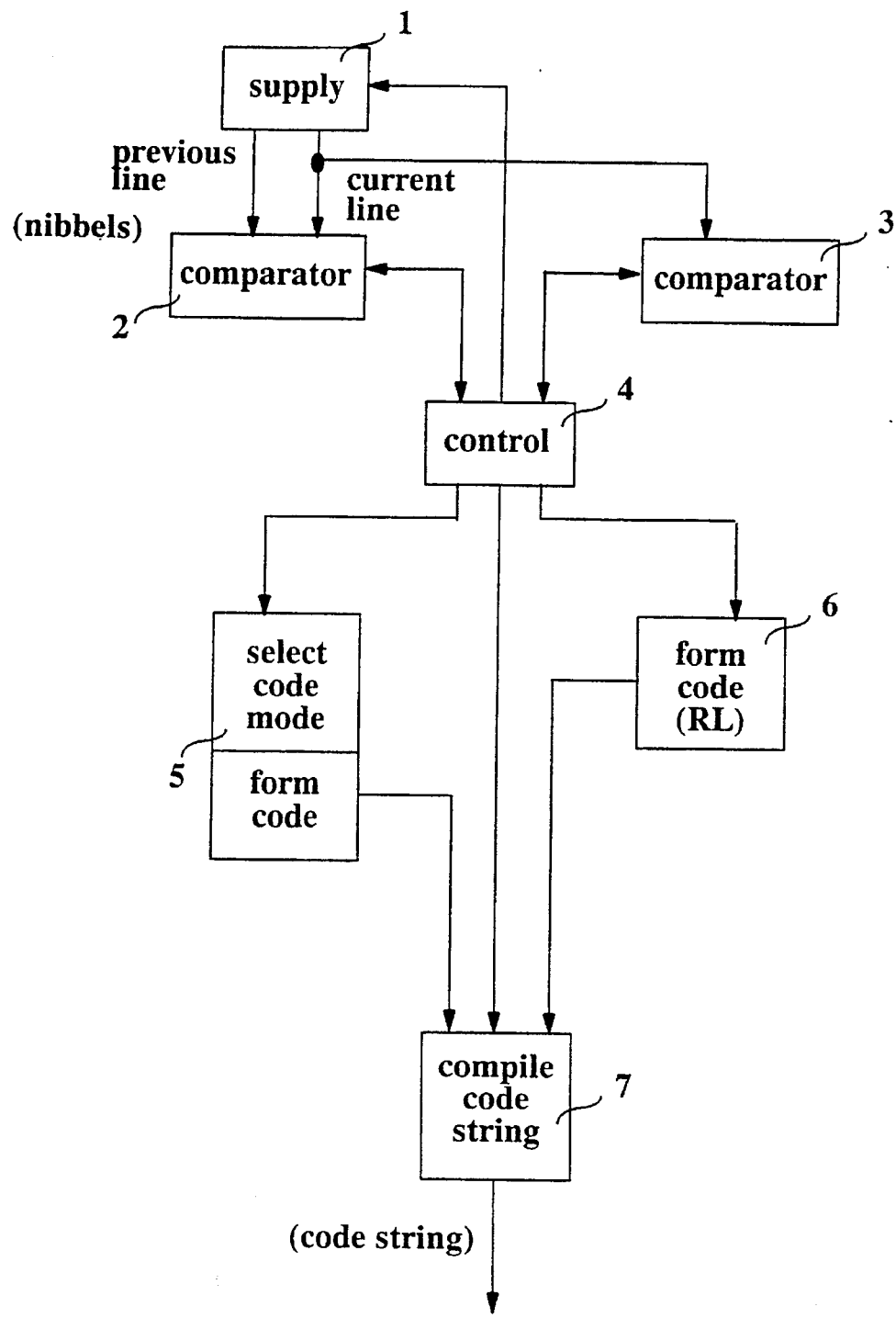
FIG. 4 is a schematic representation of a device for encoding image data in accordance with the invention.

A block scheme of an apparatus for performing the encoding according to the invention is shown in FIG. 4. It comprises a supply module 1 for supplying image data, connected to two comparators 2 and 3 and to a control module 4. Also each of the comparators is connected to the control module 4, which is further connected to two code generators 5 and 6. Both code generators and the control module are connected to a code string compiler 7. The supply module 1, which may be a memory having a read-out pointer, controlled by the control module 4, supplies the image data for encoding to the comparators 2 and 3 in nibbles of four bits at a time. It supplies the data of the image line to be encoded (the "current" line) and those of the previous image line to comparator 2, each time delivering the next nibble of the current line and the nibble at the same position of the previous line at the same time. Comparator 2 checks whether the contents of the two delivered nibbles are identical, and reports its findings to control module 4. Comparator 3, which is supplied with nibbles of the current line only, checks whether the content of the nibble delivered is identical to that of the previous nibble of the current line, and also reports its findings to control module 4.

Control module 4 processes the findings of the comparators in accordance with the method described above in relation to FIGS. 1A and 1B, and decides what kind of encoding should be performed on the image data. In case it decides for run length encoding, it starts up code generator 6, which forms a code in accordance with the method described above in relation to FIG. 2B, and in case control module 4 decides for encoding with reference to the previous image line, it starts up code generator 5, which first investigates what coding scheme (m21 to m25) to use and then encodes the image data in accordance with the method described above in relation to FIG. 2A and FIGS. 3A, 3B and 3C. Each time a code is delivered, it is added to the code string by code string compiler 7 on a command of control module 4, which also directs the pointer of supply module 1 to the next nibble to be encoded.

Figure 5:
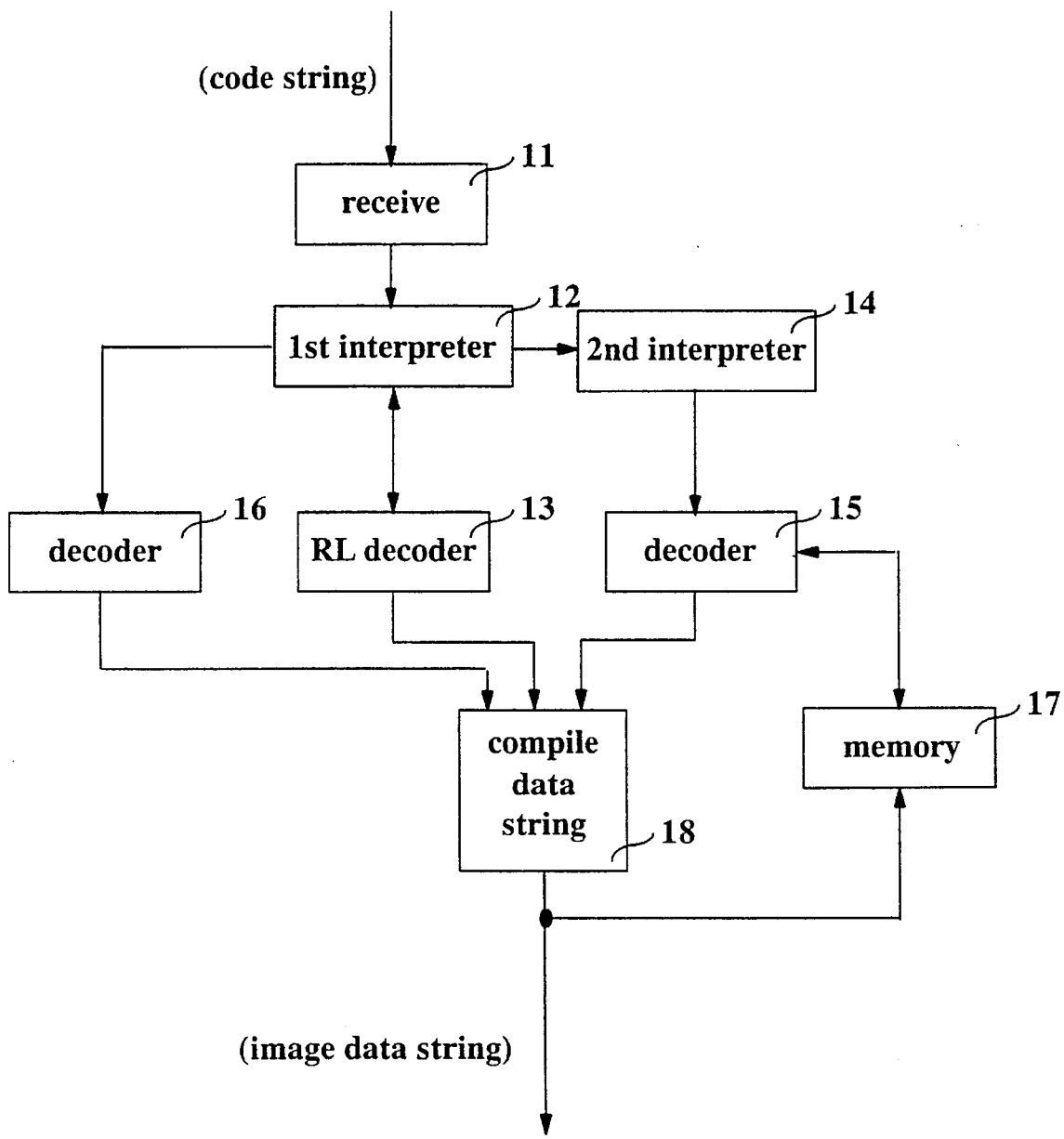
FIG. 5 is a schematic representation of a device for decoding image data in accordance with the invention.

A block scheme of an apparatus for performing the decoding according to the invention is shown in FIG. 5. It comprises a receiver 11 for receiving a code string, connected to a first interpreter 12, the latter being further connected to a run length decoder 13, a decoder 16 and a second interpreter 14. The second interpreter 14 is further connected to a decoder 15, which is also connected to a memory 17. The three decoders 13, 15 and 16, and memory 17 are further connected to a data string compiler 18. The receiver 11 delivers the code string to first interpreter 12, which reads the first two bits of the code word and therefrom decides which of the three decoders 13, 15 and 16 should be used to expand the code. Further, since the length of the code word is uniquely determined by the coding scheme, it determines the length of the code word.

In case the code is a copy code that should simply be copied into the decoded data string, first interpreter 12 passes the code word to decoder 16, which delivers the decoded data to data string compiler 18. In case the code is a run length code, first interpreter 12 passes the code word to run length decoder 13, which expands the code and delivers it to data string compiler 18. In case the code is one with reference to the previous image data line, the first interpreter passes the code word to second interpreter 14, which further decides from the code word, what decoding scheme should be used for reconstructing the image data. Second interpreter then instructs decoder 15 to actually reconstruct the image data, using the previous line of image data, which has previously been stored in memory 17. Decoder 15 delivers the reconstructed image data to data string compiler 18. Data string compiler 18 adds the delivered decoded image data to the data already decoded and passes the data on for further processing, e.g. printing. Also, when it has compiled one line of image data, it writes it into memory 17 for use by decoder 15.

Although the invention has been described in the form of the embodiments above, it is not restricted thereto. For example, a whole nibble can also always be processed at any one time. To the person skilled in the art, other embodiments are possible within the scope of the invention which are intended to be included in the following claims.

What is claimed is:

1. A method of encoding digital image data, each datum representing a pixel, wherein a series of pixels to be encoded is set according to a vertical transition in which inter-block-corresponding pixel values differ, rather than according to a horizontal transition in which intra-block-adjacent pixel values differ, the method comprising the steps of:

providing a reference block of image data;

selecting a current block of image data, the current block including at least one series of pixels;

determining a length of a series of pixels in the current block that is identical to corresponding pixels in the reference block, the length of the series being set according to a vertical transition; and encoding at least a portion of the series as a function of the number of horizontal transitions in the series.

2. A method as in claim 1, wherein:

the current block is organized into a sequence of data, each pixel in the current block corresponding to a pixel in the reference block;

wherein the step of determining includes:

organizing each of the reference block and the current block into pixel groups, each of the groups including the same predetermined number of pixels;

comparing, according to the sequence and beginning with a start group, a current group in the current block against the corresponding group in the reference block, the series being defined as beginning with the start group and continuing through the group immediately preceding the current group; and including, if the comparison established that the current group was the same as the reference group, the current group in the series by treating the next group in the series as the current group, thereby lengthening the series; and wherein the step of encoding includes:

identifying, in the reference block, groups in which at least one horizontal transition pixel is located;

forming a transition count by counting, from the reference block group corresponding to the start group, to the reference block group corresponding to the current group, the groups in which a horizontal transition pixel is located; and forming the first code as a function of the transition count.

3. A method as in claim 2, wherein:

the predetermined number of pixels in a group is one.

4. A method as in claim 2, wherein:

the predetermined number of pixels in a group is either four or eight.

5. A method as in claim 2, wherein the step of encoding includes:

encoding to additionally identify whether the group in reference block corresponding to the current group is included in the coded series.

6. A method as in claim 5, further comprising:

copying, rather than encoding, the current group when the reference block group corresponding to the current group is not included in the encoded portion of the series; and appending the copy of the current group to the encoded portion of the series.

7. A method as in claim 2, further comprising:

determining, for the series and beginning with a first pixel in the first group, a length of a run of pixels in which there are no intra-block adjacent-pixel value difference;

forming a run-length code for the run;

comparing the run-length code to the encoded portion of the series; and selecting the more efficient of the run-length code and the encoded portion of the series.

8. A method as in claim 2, further comprising:

repeating, if the series does not include all of the groups within the current block, the steps of comparing, treating, and encoding, for as many additional series as are needed to encode all the groups in the current block.

9. A method as in claim 2, wherein:

a block is defined as a line in an image;

wherein a reference block is defined as the line immediately preceding the current line.

10. A method of decoding digital image data, each decoded datum representing a pixel, wherein lengths of encoded strings of pixels have been set according to vertical transitions in which inter-block-corresponding pixel values differ, rather than according to horizontal transitions in which intra-block-adjacent pixel values differ, the method comprising the steps of:

providing a non-encoded reference block of image data;

providing a current code representing a current encoded block that is to be converted to a decoded current block, the current encoded block representing at least one string of pixels the length of which has been set according to a vertical transition;

recognizing a first part of the current code, the first part of the current code having been formed as a function of a number of horizontal transitions in a string of pixels in the reference block; and partially decoding the current code according to the first part of the current code.

11. A method as in claim 10, wherein:

wherein the reference block is organized as a sequence of data;

wherein each pixel in a non-encoded current block corresponds to a pixel in the reference block;

wherein each of the reference block and the non-encoded current block is organized into pixel groups, each of the groups including the same predetermined number of pixels;

wherein the step of partially decoding includes:

determining, from the first part of the current code, the group in the reference block in which is located a horizontal transition that terminates the string; and copying the string, defined as running from a first reference block group to the reference block group in which is located the horizontal transition that terminates the string, as a first portion of the decoded current block.

12. A method as in claim 11, further comprising:

copying, after the string is decoded, as the next decoded group in the decoded current block, the group in the reference block immediately following the group in which is located the horizontal transition that terminates the string.

13. A method as in claim 10, further comprising:

treating, after the current decoded block has been formed, the current decoded block as the next reference block; and selecting another encoded block as the current encoded block.

14. A method as in claim 13, wherein:

a block is defined as a line in an image;

wherein the new encoded block corresponds to the next line in the image.

15. An apparatus for encoding digital image data, each datum representing a pixel, wherein a series of pixels to be encoded is set according to a vertical transition in which inter-block-corresponding pixel values differ, rather than according to a horizontal transition in which intra-block-adjacent pixel values differ, the apparatus comprising:

reference means for providing a reference block of image data;

selection means for selecting a current block of image data, the current block including at least one series of pixels;

determining means for determining a length of a series of pixels in the current block that is identical to corresponding pixels in the reference block, the length of the series being set according to a vertical transition; and encoding means for encoding at least a portion of the series as a function of the number of horizontal transitions in the series.

16. An apparatus as in claim 15, wherein:

the current block is organized into a sequence of data, each pixel in the current block corresponding to a pixel in the reference block;

wherein the determining means includes:

organizer means for organizing each of the reference block and the current block into pixel groups, each of the groups including the same predetermined number of pixels;

comparison means for comparing, according to the sequence and beginning with a start group, a current group in the current block against the corresponding group in the reference block, the series being defined as beginning with the start group and continuing through the group immediately preceding the current group; and inclusion means for including, if the comparison established that the current group was the same as the reference group, the current group in the series by treating the next group in the series as the current group, thereby lengthening the series; and wherein the encoding means includes:

identifier means for identifying, in the reference block, groups in which at least one horizontal transition pixel is located;

counter means for forming a transition count by counting, from the reference block group corresponding to the start group, to the reference block group corresponding to the current group, the groups in which a horizontal transition pixel is located; and forming means for forming the first code as a function of the transition count.

17. An apparatus as in claim 16, wherein:

the predetermined number of pixels in a group is one.

18. An apparatus as in claim 16, wherein:

the predetermined number of pixels in a group is either four or eight.

19. An apparatus as in claim 16, wherein the encoding means includes:

means for encoding to additionally identify whether the group in reference block corresponding to the current group is included in the coded series.

20. An apparatus as in claim 19, further comprising:

copying means for copying, rather than encoding, the current group when the reference block group corresponding to the current group is not included in the encoded portion of the series; and appending means for appending the copy of the current group to the encoded portion of the series.

21. An apparatus as in claim 16, further comprising:

length means for determining, for the series and beginning with a first pixel in the first group, a length of a run of pixels in which there are no intra-block adjacent-pixel value difference;

RL means for forming a run-length code for the run;

checking means for comparing the run-length code to the encoded portion of the series; and selection means for selecting the more efficient of the run-length code and the encoded portion of the series.

22. An apparatus as in claim 16, wherein:

a block is defined as a line in an image;

wherein a reference block is defined as the line immediately preceding the current line.

23. An apparatus for decoding digital image data, each decoded datum representing a pixel, wherein lengths of encoded strings of pixels have been set according to vertical transitions in which inter-block-corresponding pixel values differ, rather than according to horizontal transitions in which intra-block-adjacent pixel values differ, the apparatus comprising:

reference means for providing a non-encoded reference block of image data;

means for providing a current code representing a current encoded block that is to be converted to a decoded current block, the current encoded block representing at least one string of pixels the length of which has been set according to a vertical transition;

recognition means for recognizing a first part of the current code, the first part of the current code having been formed as a function of a number of horizontal transitions in a string of pixels in the reference block; and decoding means for partially decoding the current code according to the first part of the current code.

24. An apparatus as in claim 23, wherein:

wherein the reference block is organized as a sequence of data;

wherein each pixel in a non-encoded current block corresponds to a pixel in the reference block;

wherein each of the reference block and the non-encoded current block is organized into pixel groups, each of the groups including the same predetermined number of pixels;

wherein the decoding means includes:

determination means for determining, from the first part of the current code, the group in the reference block in which is located a horizontal transition that terminates the string; and copier means for copying the string, defined as running from a first reference block group to the reference block group in which is located the horizontal transition that terminates the string, as a first portion of the decoded current block.

25. An apparatus as in claim 24, further comprising:

appending means for copying, after the string is decoded, as the next decoded group in the decoded current block, the group in the reference block immediately following the group in which is located the horizontal transition that terminates the string.

26. An apparatus as in claim 23, wherein:

the reference means treats, after the current decoded block has been formed, the current decoded block as the next reference block; and selection means for selecting another encoded block as the current encoded block.

27. An apparatus as in claim 26, wherein:

a block is defined as a line in an image;

wherein the new encoded block corresponds to the next line in the image.

\* \* \* \* \*